Figure 1:
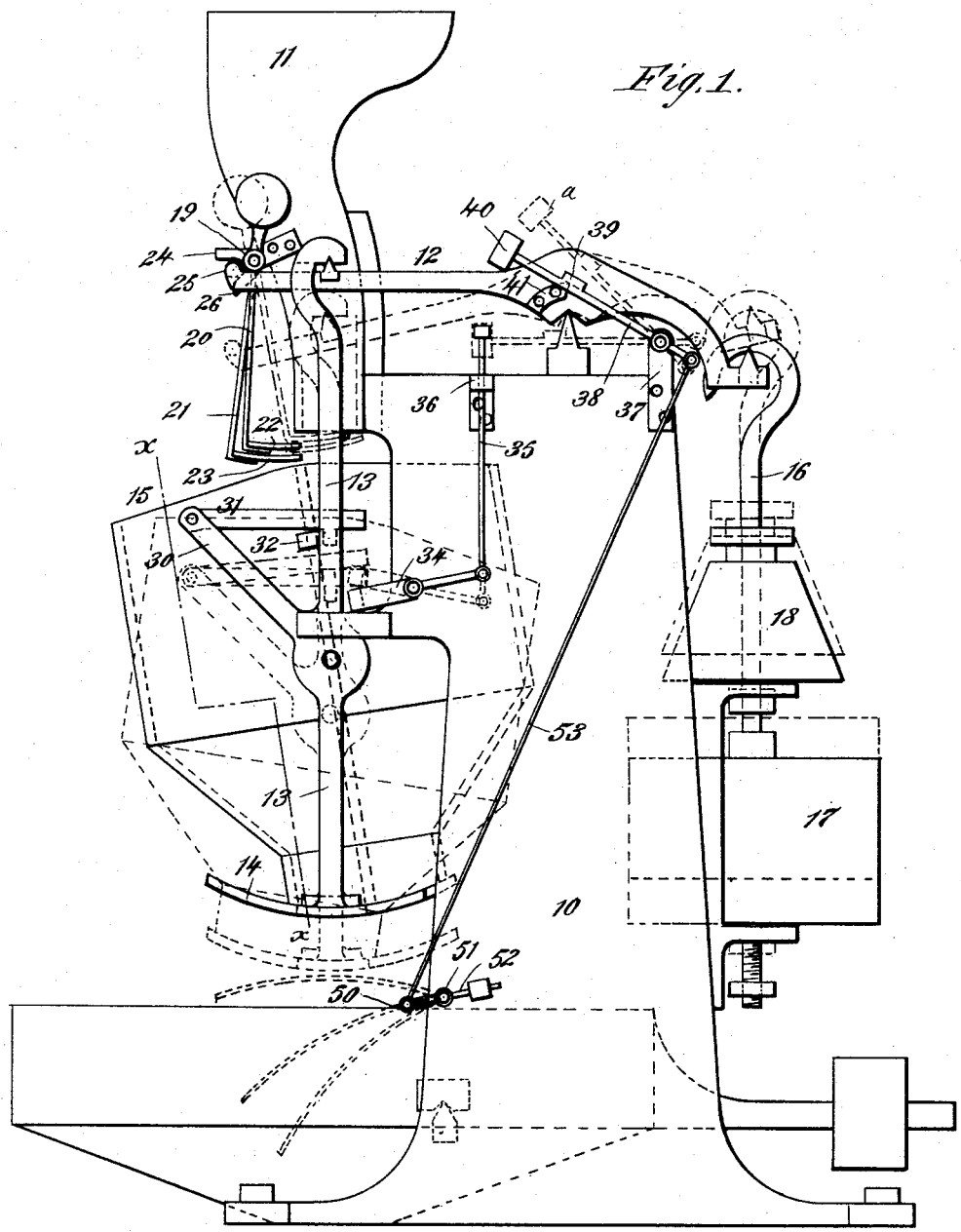

(No Model.)  2 Sheets—Sheet 1.

J. H. SHELLEY.
ATTACHMENT FOR GRAIN SCALES.

No. 413,871.  Patented Oct. 29, 1889.

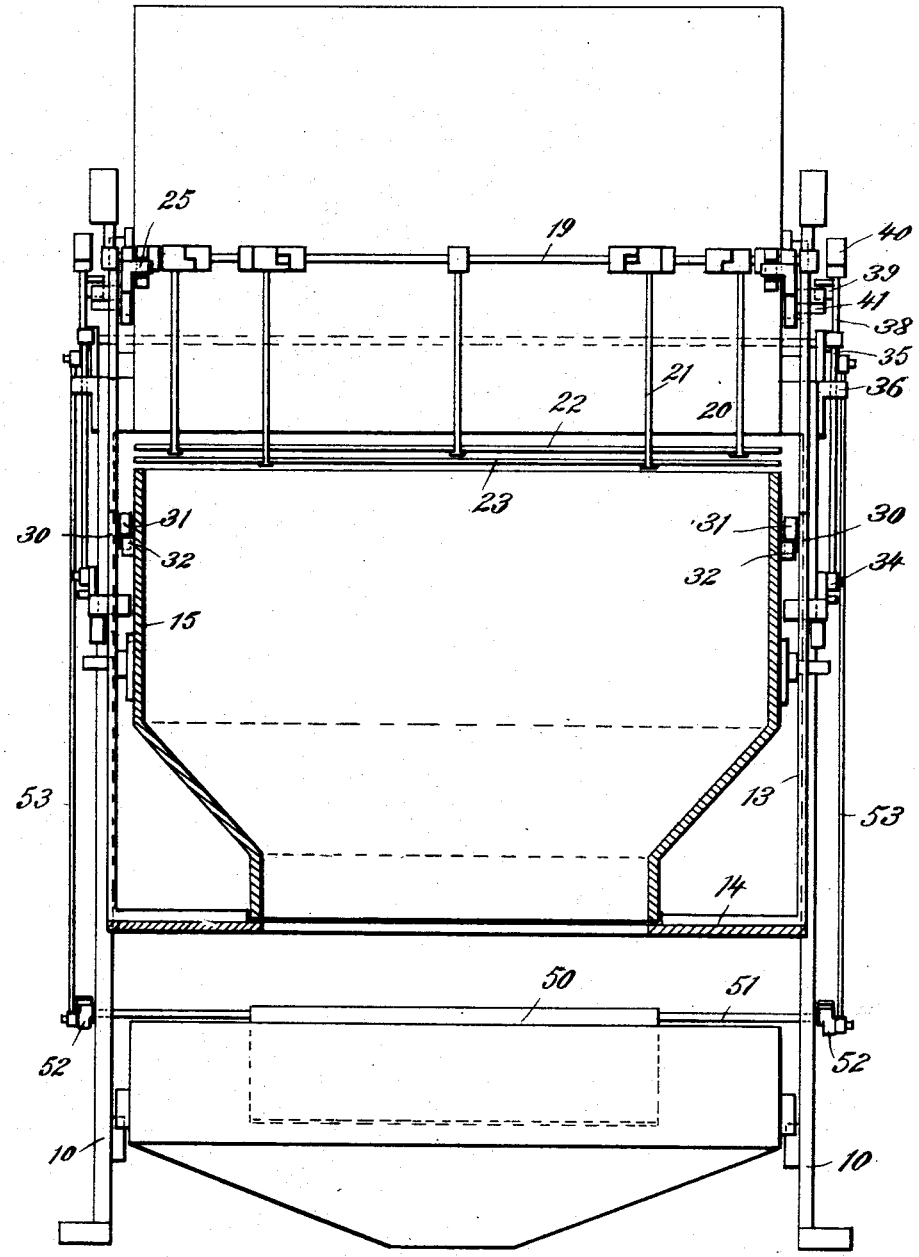

UNITED STATES PATENT OFFICE.

JAMES H. SHELLEY, OF BROOKLYN, N. Y.

ATTACHMENT FOR GRAIN-SCALES.

SPECIFICATION forming part of Letters Patent No. 413,871, dated October 29, 1889.

Application filed April 25, 1889. Serial No. 308,565. (No model.)

*To all whom it may concern:*

Be it known that I, JAMES H. SHELLEY, of Brooklyn, in the county of Kings and State of New York, have invented a new and Improved Scales Attachment, of which the following is a full, clear, and exact description.

This invention relates to automatic grain-weighing appliances, the main object of the invention being to provide for the utilization of the weight of the discharging grain to return a bucket-tripping attachment to a position such that it will act to trip the bucket-retaining attachment just prior to each discharge of the bucket.

To the end named the invention consists of novel constructions, arrangements, and combinations of elements, to be hereinafter fully explained, and specifically pointed out in the claims.

Reference is to be had to the accompanying drawings, forming a part of this specification, in which similar figures of reference indicate corresponding parts in both views.

Figure 1 is a side view of my improved scales attachment, and Fig. 2 is a sectional elevation on line x x of Fig. 1.

In the drawings, 10 represents standards, which support a hopper 11, and upon which there is mounted a beam 12, from which beam there are suspended arms 13, which carry a centrally-apertured plate 14 and serve as supports for a centrally-divided bucket 15. The weights arranged in connection with the beam 12 are upheld by a rod 16, a main weight 17 and an auxiliary weight 18 being employed in this connection. The hopper 11 carries a shaft 19, upon which there are supported arms 20 and 21, which carry cut-off plates 22 and 23, respectively.

The beam 12 normally bears against a projection 24, which is carried by the shaft 19, the arrangement being such that when the grain is discharging from the hopper the plates 22 and 23 will be held from beneath the hopper; but as one side of the bucket 15 fills the forward end of the beam 12 will lower, and a projection 25 formed on said beam will bear upon a projection 26, connected to the shaft 19 and the plates will be thrown inward to close the lower end of the hopper, one plate moving before the other does.

The arms 13 are formed with forwardly-extending auxiliary arms 30, to which there are pivoted latches 31, which engage projections 32, that are carried by the bucket 15, the latches engaging the rear faces of the projections when the parts are in the position in which they are shown in Fig. 1, and preventing the tilting of the bucket until such time as it is desirable that the tilting should be brought about.

The above is the ordinary construction of a grain-weighing scale of the Hill type, and I make no claim to such construction.

In order that the latches 31 may be thrown from engagement with their projections 32, I pivotally connect levers 34 to the standards 10, and to the rear ends of these levers I secure upwardly-extending rods 35, which are guided by means of brackets 36. To the rear upper corners of the standards 10 I secure brackets 37, upon which there are pivotally mounted levers 38, which carry inwardly-extending projections 39, the ends of the levers being provided with weights 40. When the beam is in the position shown in full lines in Fig. 1, the levers 38 will be upheld by projections 41 carried by the beam just in advance of the beam-fulcrum; but as one side of the bucket fills the beam will rock to the position indicated by dotted lines in Fig. 1, and the projections 41 will ride from underneath the projections 39, thus permitting the levers 38 to drop. These levers 38 are so proportioned that in dropping they will strike against the upper ends of the stems or rods 35, and as the stems are so struck they will move downward and the forward ends of the levers 34 will be carried upward and will strike against the inner ends of the latches 31, throwing said latches upward and out of engagement with the projections 32, and thus permitting the bucket to tilt to the position indicated by dotted lines in Fig. 1, the bucket in the meantime having filled and the beam, as above stated, having rocked so as to slightly lower the bucket. In order that the levers 38 may be returned to a position above the projections 41, I hinge a plate 50 beneath the discharge-orifice of the plate 14, such plate 50 being mounted upon a shaft 51, to which shaft there are connected counterbalancing-levers 52, and to the forward ends of these levers I connect rods 53, that are in turn connected to the rear ends of the levers 38, so that as the grain discharges through the aperture in the plate 14 the plate 50 will be depressed, and as the plate 50 moves downward the levers 38 will be carried upward to the position in which they are shown in dotted lines at $a$ in Fig. 1, there to be held until all the grain has been discharged from one side of the bucket. Then, as the beam 12 returns to its normal position, the grain upon the plate 50 will slide off and the levers 38 will drop downward until their projections 39 rest upon the beam projections 41. At the same time the latches 31 will engage the forward faces of the projections 32 and will hold the bucket so that its forward compartment will be beneath the hopper-opening. Then as the bucket fills and the beam lowers the operation will be repeated, except that at the next rising of the bucket the rear faces of the projections 32 will be again engaged.

From the above description it will be seen that I utilize the weight of the grain discharged from the bucket to return the weighted levers to their operative position, and consequently provide for a more delicate adjustment of the scale than could be obtained if the beam-weights were employed to return the weighted levers 38.

Having thus described my invention, I claim as new and desire to secure by Letters Patent—

1. The combination, with a plate arranged to be pivotally supported beneath the discharge-orifice of the grain-scales, of a weighted lever formed with a lateral projection and arranged for pivotal connection with the scale-standard, a latch-tripping lever also arranged for pivotal connection with the standard, and connections such that the falling of the weighted lever will actuate the latch-tripping lever, substantially as described.

2. In grain-measuring scales, the combination, with a pivotally-mounted leaf or plate, of weighted levers, connections between the plate and the levers, projections carried by the levers, projections carried by the scale-beam upon which the lever projections rest, a tilting bucket, a latch arranged in connection therewith, a latch-tripping lever, and an upwardly-extending stem carried by the latch-tripping lever, substantially as described.

3. In grain-measuring scales, the combination, with a tilting bucket provided with projections 32, of latches 31, supported substantially as described, latch-tripping levers 34, upwardly-extending stems 35, carried by the levers, weighted levers 38, formed with projections 39, projections 41, carried by the scale-beam, a plate 50, and connections, substantially as described, between the plate and the weighted levers, as and for the purpose stated.

JAMES H. SHELLEY.

Witnesses:
EDWARD KENT, Jr.,
C. SEDGWICK.